United States Patent [19]

Burchette, Jr.

[11] 4,385,480
[45] May 31, 1983

[54] APPARATUS FOR WRAPPING OR PRODUCING CYLINDRICAL ARTICLES AND METHOD FOR SAME

[76] Inventor: Robert L. Burchette, Jr., P.O. Box 188, Spartanburg, S.C. 29304

[21] Appl. No.: 72,327

[22] Filed: Sep. 4, 1979

[51] Int. Cl.³ .............................................. B65B 11/04
[52] U.S. Cl. ...................................... 53/399; 53/211; 53/587; 493/289; 493/290; 493/301; 83/308
[58] Field of Search ................. 53/399, 465, 211, 587, 53/588; 93/77 CL, 80; 82/53.1; 221/301; 493/274, 289, 290, 299, 300, 301; 83/160, 308

[56] References Cited

U.S. PATENT DOCUMENTS

| | | | |
|---|---|---|---|
| 549,707 | 11/1895 | Denney | 82/53.1 |
| 603,602 | 5/1898 | Crowell | 53/587 |
| 1,807,869 | 6/1931 | Okey | 53/587 |
| 1,870,399 | 8/1932 | Butler | 53/211 |
| 1,944,970 | 1/1934 | Dieffenbach | 493/301 |
| 2,026,469 | 12/1935 | Hamilton | 53/588 |
| 2,168,203 | 8/1939 | Green | 493/290 |
| 2,250,430 | 7/1941 | Wade | 93/80 |
| 3,068,934 | 12/1962 | Mauck | 493/299 |
| 3,139,011 | 6/1964 | Glasby | 93/80 |
| 3,165,034 | 1/1965 | Cracho | 93/80 |
| 3,229,598 | 1/1966 | Yovanovich | 93/80 |
| 3,332,675 | 7/1967 | Bandura | 82/53.1 |
| 3,333,733 | 8/1967 | Clark | 221/301 X |
| 3,580,461 | 5/1971 | Dobell | 493/299 |
| 3,960,624 | 6/1976 | Erlandson | 93/80 X |
| 3,991,907 | 11/1976 | Kull | 221/301 X |
| 4,050,220 | 9/1977 | Lancaster | 53/588 X |

FOREIGN PATENT DOCUMENTS

| | | | |
|---|---|---|---|
| 1302657 | 7/1962 | France | 83/160 |
| 368123 | 4/1973 | U.S.S.R. | 53/211 |
| 397426 | 2/1974 | U.S.S.R. | 53/211 |

Primary Examiner—John Sipos
Attorney, Agent, or Firm—Wellington M. Manning, Jr.; Luke J. Wilburn, Jr.

[57] ABSTRACT

Apparatus for continuously applying a spiral wrap around successive cylindrical articles, securing the wrap to the cylindrical articles forming a series of wrapped articles, and subsequently severing individual wrapped articles from the wrapped series of same. Cylindrical articles are deposited onto a conveyor belt along which they are fed in proper alignment and in end to end abutting relationship to a wrapping station. At the wrapping station, a covering material, such as paper or the like is spirally applied to the successive rotating cylindrical articles in continuous fashion. Rotary and forwarding motion is supplied by a drive belt acting on previously wrapped articles which motion is imparted to the individual articles at the wrapping station. Subsequent to the wrapping station, the wrap or cover is secured to the cylindrical article by contact heaters, tunnel heaters, adhesive, or the like. The wrapped series of articles is fed to a severing station where cutters operating in timed relationship with movement of the series sever the individual articles therefrom. Cylindrical tubes may also be produced by the instant apparatus by utilizing a cylindrical, rotating mandrel and maintaining the mandrel at the wrapping station. Methods of continuously wrapping cylindrical articles, and producing cylindrical tubes are also disclosed.

30 Claims, 13 Drawing Figures

APPARATUS FOR WRAPPING OR PRODUCING CYLINDRICAL ARTICLES AND METHOD FOR SAME

BACKGROUND OF THE INVENTION

The present invention is particularly adapted to the wrapping of dye tubes for the textile industry with a filter paper covering, but is equally applicable to wrapping cylindrical articles in general and of any particular size where a spiral wrap is continuously applied to a succession of articles, the wrap is secured to or around the articles and subsequently the individual articles are severed from the wrapped series. It has heretofore been desirable to apply a filter paper to plastic dye tubes for the textile industry to improve the efficiency of the dyeing operation. Certain of the yarn dye tubes are rigid, and thus of a constant length during dyeing, while others are axially compressible in the dye kettle with the yarn wound therearound. In general, such yarn dye tubes are manufactured from synthetic polymeric materials that are thermoplastic in character. Structurally, the side walls of the dye tubes are skeletal or perforated to permit dye liquors to pass therethrough into intimate contact with yarn wound around the tube. A filter paper wrap around the tube and beneath the yarn insures an even flow of dye liquor through the tube wall along the full length of same, and improves unwinding of the yarn from the tube after dyeing.

Different textile yarn products dictate variation in size of dye tubes, both as to diameter and length. Historically, pre-cut sheets of filter paper of the proper length and width have been secured by hand or by machine around individual dye tubes, or rolls of filter paper have been employed at certain widths, being applied to tubes corresponding in length to the paper width.

The present invention provides apparatus for serially wrapping a continuous succession of dye tubes or other cylindrical articles with a covering of a constant width after which the paper is appropriately secured to or around the cylindrical article, the individual cylindrical article is severed from the series of wrapped articles and deposited in an appropriate container. The apparatus of the present invention thus affords tremendous advantage over the conventional process for wrapping dye tubes or cylindrical articles of any fashion where a spiral wrap is appropriate therefor. Likewise apparatus of the present invention is capable of economically producing spiral wrapped tubular elements of varying length and diameter. Of particular advantage for the present apparatus and method is the flexibility to wrap cylindrical articles of varying size and length in continuous fashion while utilizing a covering material of standard width.

SUMMARY OF THE INVENTION

It is an object of the present invention to provide apparatus for continuously applying a spiral wrap to cylindrical articles.

Another object of the present invention is to provide apparatus for continuously wrapping a succession of textile yarn dye tubes with a filter paper covering.

Yet another object of the present invention is to provide apparatus for use in continuously wrapping a succession of cylindrical articles of varying lengths and diameters.

Still further, an object of the present invention is to provide an apparatus and method for producing cylindrical tubes.

Another object of the present invention is to provide an improved method for the wrapping of cylindrical articles of varying lengths and widths.

Yet another object of the present invention is to provide an improved method for the wrapping of thermoplastic dye tubes with an appropriate filter paper, and securing the filter paper thereto.

Generally speaking, apparatus of the present invention includes a wrapping station, said station comprising at least one supply means for wrapping material, said supply being angularly disposed with respect to an axis of an article around which the wrapping material is to be placed; wrapping securement means for securing said wrapping material around said article; drive means adjacent said wrapping securement means for imparting rotary and forwarding forces to said secured wrapping material; and severing means for cutting said wrapping material at predetermined intervals.

More specifically, the apparatus of the present invention affords a means for continuously wrapping a plurality of successive cylindrical articles, or for producing a tubular element around a mandrel. For wrapping use, the apparatus generally includes a feed station where cylindrical articles are supplied to a conveying means, preferably a conveyor belt. The conveyor belt transports the cylindrical articles through appropriately located guide means which properly align same with respect to preceding articles, and further, operates at a speed greater than the wrapping rate for the cylindrical articles whereby end to end abutting relationship between adjacent cylindrical articles is maintained at the wrapping station. Delivery means are provided at the juncture between an article supply tray and the conveyor belt to admit a predetermined number of cylindrical articles to the conveyor belt at any particular time. Moreover, switch means are provided along the length of the conveyor belt to determine when further cylindrical articles are required and to actuate the dispensing means to deposit a further number of cylindrical articles onto the conveyor belt. Additional switch means are provided immediately adjacent the wrapping station to halt operation of the wrapping machine where no articles are presented thereat for wrapping.

At the wrapping station, at least one supply of a covering material such as a paper of a predetermined width is continuously supplied to the succession of cylindrical articles. The covering material is supplied at a predetermined angle to achieve a desired spiral wrap around the articles. One or more guide rods are located at the wrapping station which provide proper alignment of covering material and assist in providing proper tensioning of the material.

Drive means for the previously wrapped articles preferably comprises a driven belt that extends around the wrapped articles at a similar angular relationship as that of the covering. A rotary, forwarding motion is imparted to the wrapped series of articles to forward same to the severing station while continuously drawing covering material onto additional articles located at the wrapping station. Due to the angular association between the drive means and the wrapped cylindrical articles, a certain amount of torque is created, which under certain circumstances can distort the wrapping on the articles. It is thus preferred to locate the drive means immediately adjacent the wrapping securement means. The covering material supply and the drive means are preferably located on a common support frame that is angularly adjustable with respect to the path of travel of the cylindrical articles whereby the angle of the spiral wrap being produced around the articles and the drive angle may be simultaneously varied according to dictates of the wrap, size of the articles, or the like.

Located between the wrapping station and the drive means for the wrapped series of articles is a wrapper securement zone for securing the wrapper covering to or around the cylindrical article. For the wrapping of yarn dye tubes, the securement zone preferably includes a plurality of heaters that are pivotally moveable into and out of contact with the wrapped articles and which apply heat to the thermoplastic article, to soften the surface of same to adhere the wrapper covering thereto. The securement zone, may however, include means for applying an adhesive to the article, or the wrapper, a heating tunnel, sonic welders or the like. Of course, various numbers of individual heaters may be employed to operate at temperatures dictated by the particular article being wrapped, speed of wrapping, number and total length of heaters, or the like.

After the articles are wrapped and the wrapper secured thereto, the wrapped series of articles is driven in a rotary, forwarding motion to an article severing means where the individual articles may be separated from the wrapped series. Preferably, as illustrated in the drawings, a collar is located at the entrance to the article severing means through which the wrapped cylindrical articles pass, being properly positioned by guide means at the entrance to the collar. Cutting means are associated with the collar, normally in an inactive mode. The series of articles is fed through the opening in the collar and the forward most article engages a bearing surface located a predetermined distance therefrom. The collar and bearing surface are secured to a counter weighted moveable carriage, and the force of the wrapped article against the bearing surface causes the carriage to move outwardly to a point where a switch means is energized to actuate the cutting or severing means. The article severing means then acts on the wrapped series at the proper location, i.e., the juncture between articles, to cut the individual article from the series. The severed article then falls from the carriage into a receptacle. After removal of pressure on the bearing surface, the carriage, due to the counter weight, returns to its original position and receives a further article to be severed. In a preferred embodiment, the article severing means includes a plurality of blades that are moveable into and out of a cutting position. When in the cutting position the blades engage the wrapper covering around the article and rotary movement of the wrapped series causes complete severance of the article from the series. In certain instances, the article may become lodged between the rear side of the collar and the bearing surface. A plunger is thus provided on the carriage which is actuated in timed relation with the cut to engage the severed article and force same from its location between the bearing surface and the rear of the collar. The bearing surface is adjustable to vary the distance from the collar, whereby articles of different lengths may be conveniently wrapped by the apparatus of the present invention.

The apparatus according to the present invention may also be employed for the manufacture of cylindrical tubular elements. A rotatable mandrel is utilized in lieu of a supply of articles, and is maintained at the wrapping station. Suitable apparatus for adhesively or otherwise securing the tube material to itself around the mandrel is included and the tubes so formed are driven off the mandrel by the rotary and forwarding drive means. Thereafter, the tubes of predetermined length are severed from the continuous length by the severing means.

DESCRIPTION OF THE PREFERRED EMBODIMENTS

Figure 1:
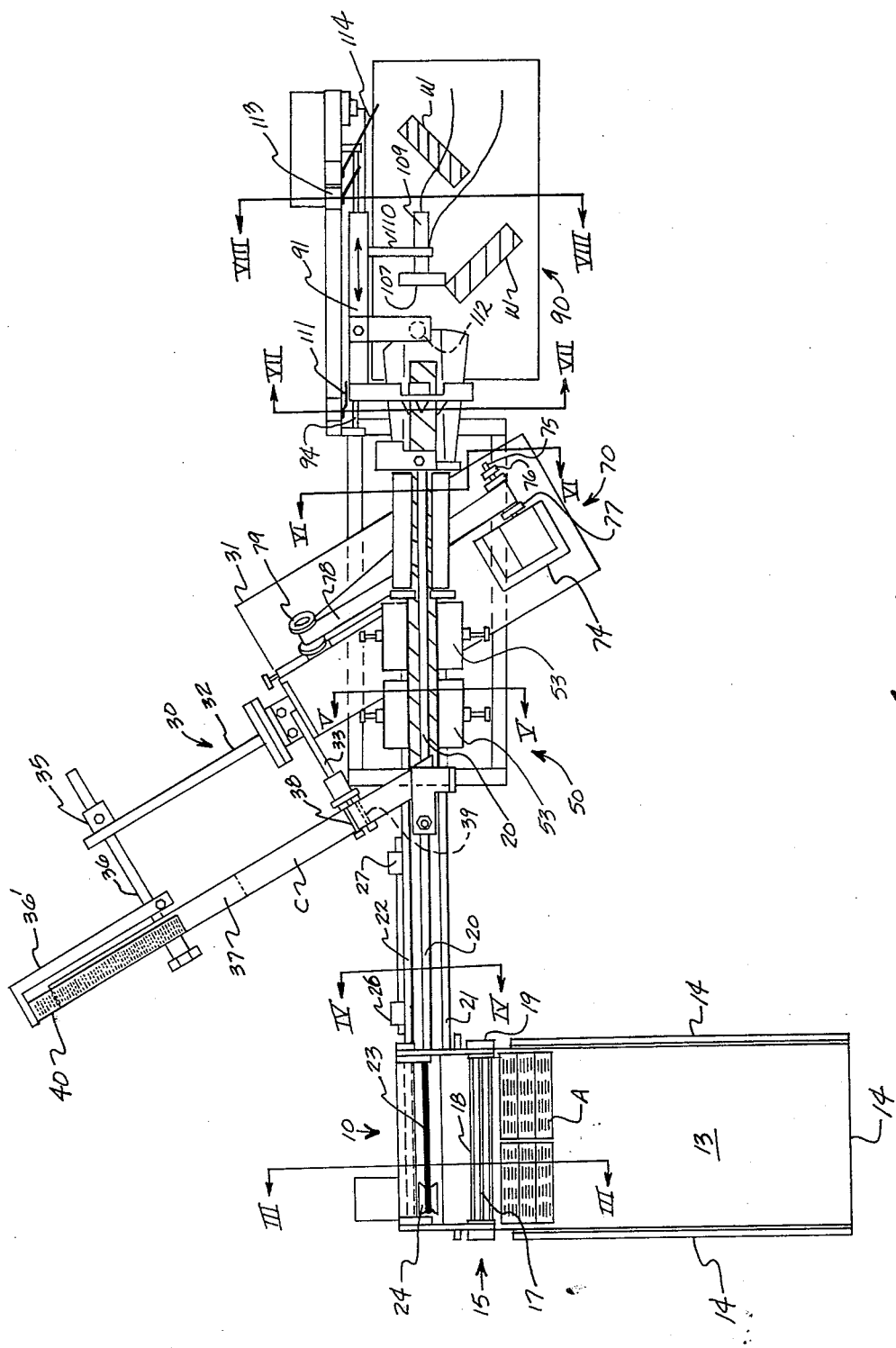
FIG. 1 is a plan view of apparatus according to teachings of the present invention.

Making reference to FIGS. 1 and 2, the apparatus and method of the present invention will be described in detail. In a wrapping embodiment, a supply means generally indicated as 10 is provided, from which cylindrical articles A are fed to a wrapping station generally indicated as 30. At wrapping station 30, a wrapper covering C is supplied to a continuing series of cylindrical articles A, after which covering C is secured thereto or therearound A at a securement zone generally indicated as 50. Wrapper according C is supplied to the series of articles A from an idler support, and motive force to draw covering C around articles A is afforded by a drive means generally indicated as 70. Drive means 70 is preferably a belt drive arrangement, to be described in detail hereinafter, which imparts both a rotary and a forwarding motion to the wrapped articles W. This combination force thus provides a continuous rotation of the previously wrapped series of articles W and draws covering C around further articles A at wrapping station 30. After covering C has been applied to articles A and secured thereto, the wrapped articles W are fed to an article severing zone generally indicated as 90 where the individual wrapped articles W are severed from the wrapped series and are deposited into an appropriate container.

While obviously the apparatus and method according to the teachings of the present invention may be utilized for applying a spiral continuous wrap to cylindrical articles of various designs, sizes and lengths, in the context of the present invention, the preferred use is for the application of spirally wrapped filter paper covering around a yarn dye tube after which the wrapped article is heated to bond the filter paper around the tube. As the series of wrapped tubes W appears at the article severing means 90, the individual tubes are severed from the series and may thereafter be used as appropriately intended. In the context of the discussion of the preferred embodiments of the present invention, the cylindrical article A is a dye tube and the wrapper covering C is the filter paper.

As shown in FIGS. 1-4, the supply means generally indicated as 10 affords a continuous supply of tubes A to the wrapping station generally indicated as 30. Supply means 10 is supported by a structural framework for the apparatus, generally indicated as 11, having a sloped tray 13 supported thereon. As illustrated, tray 13 is provided with side walls 14 and is preferably of sufficient width to accommodate two adjacent feed lines of tubes A. A plurality of tubes A are thus placed in tray 13 and roll down the slope, to the bottom of same where they are held by an article delivery means generally 15 which includes a pair of end plates 16 having a plurality of rods 17, 18 extending therebetween. (See FIGS. 3 and 4.) End plates 16 are supported for pivotal movement from supports 19.

Article delivery means 15 pivots rearwardly about supports 19 whereby two tubes A from the supply in tray 13 pass beneath rod 17 and encounter rod 18. A return of delivery means 15 to its downward position separates the two tubes A from the bulk. A forward pivotal motion of delivery means 15 causes end 18 to raise and release the two tubes which then roll into a trough defined by a pair of side guide rods 21 and 22 and a conveyor belt 23. Conveyor belt 23 is an endless belt received around two pulleys 24, one of which is driven, and transports tubes A to the wrapping means 30. A further, upper guide rod 20 is provided between supply means 10 and wrapping means 30 and cooperates with side guide rods 21 and 22 to properly align tubes A for wrapping. Guide rods 20, 21 and 22 extend along the remaining length of the wrapping machine to the article severing means 90 to continuously maintain tubes A in proper alignment before, during and after wrapping. Conveyor belt 23 operates at a speed greater than the rate of wrapping, whereby end to end abutting relation is insured between all adjacent tubes A at wrapping means 30, and preferably has a tension means S beneath same to exert upward force on conveyor belt 23 to insure proper contact with article A.

Immediately adjacent the beginning of guide rod 20 is a switch means 26 which is operatively associated with article delivery means 15 to determine when further tubes A should be deposited onto conveyor belt 23. So long as switch means 26 is made by the presence of a tube A proximate thereto, no further tubes will be deposited onto conveyor belt 23. When, however, no tube A is proximate switch 26, article delivery means 15 is actuated to pivot forward and deposit two tubes onto conveyor belt 23, and then rearwardly to segregate two further tubes A from those on tray 13. Immediately adjacent the wrapping means 30 is a further switch means 27 which is operatively associated with the main power to the apparatus. At such times when switch means 27 is not made by a tube A being proximate thereto, the wrapping machine will automatically shut off. Switches 26 and 27 are preferably contact switches where the tubes A make physical contact with a portion of the switch. It is, of course, within the purview of the present invention to use any type of switch means or detection means that would be responsive to the presence or absence of an article A at a proper location to achieve the intended result.

Figure 2:
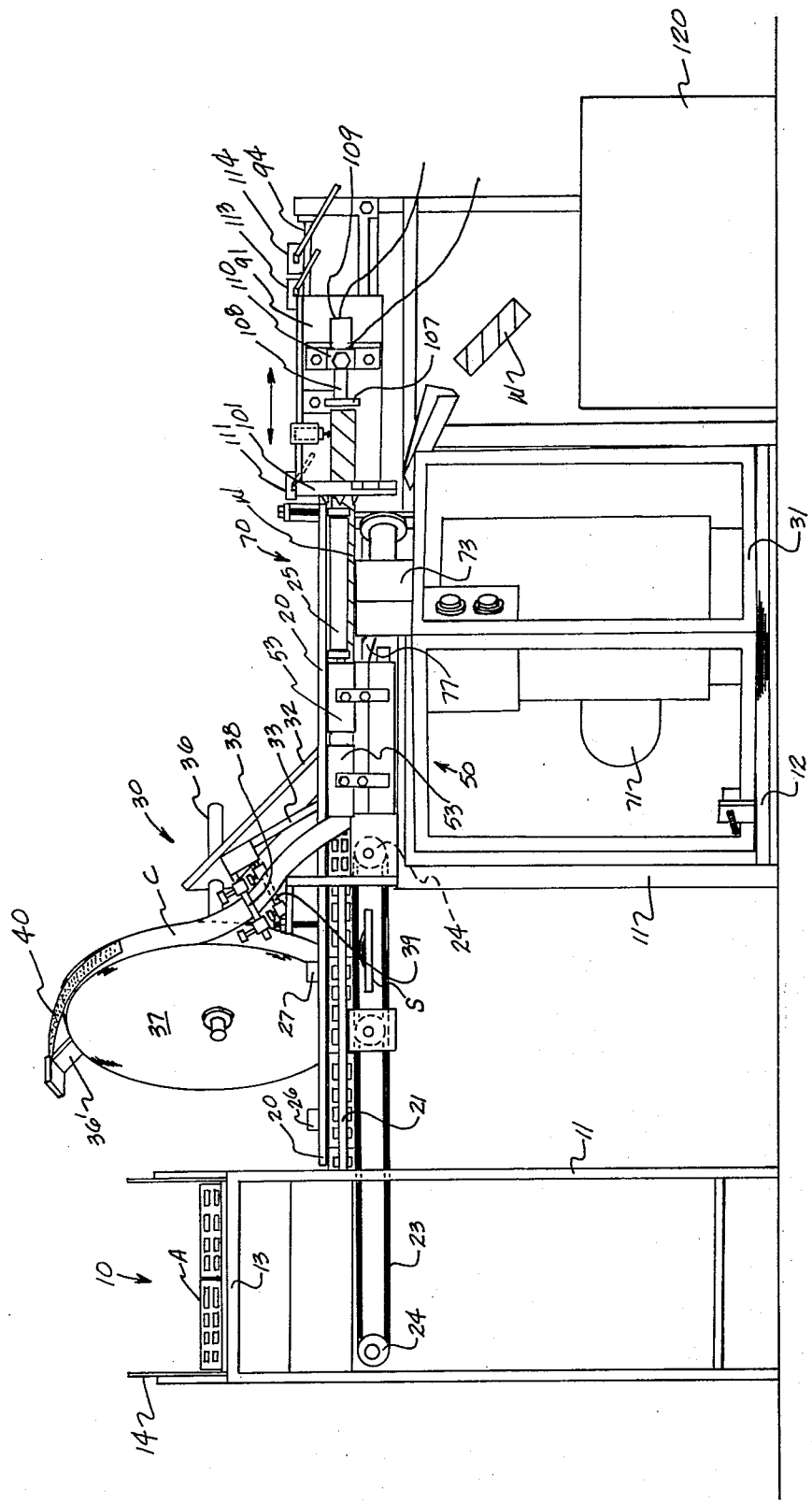
FIG. 2 is a side elevation of the apparatus as illustrated in FIG. 1.
Figure 3:
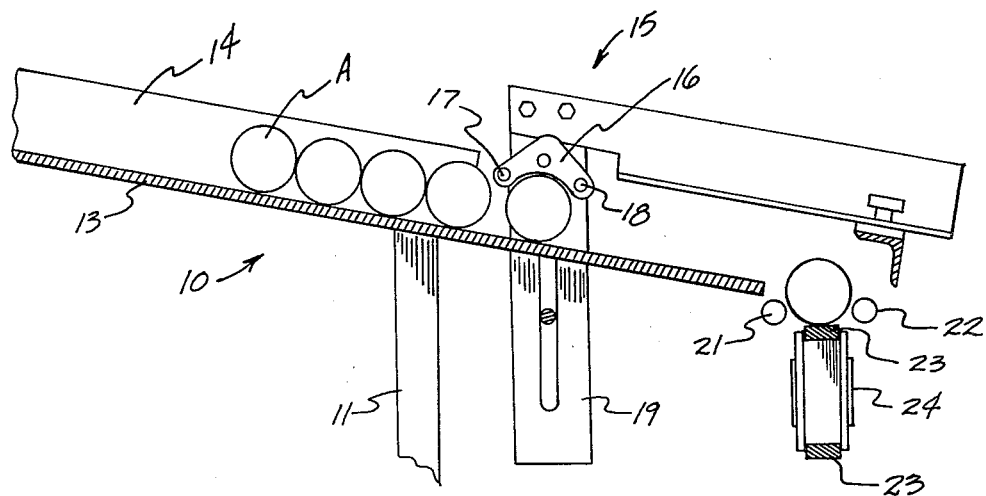
FIG. 3 is a vertical cross-sectional view of the apparatus as shown in FIG. 1 taken along a line III—III.
Figure 4:
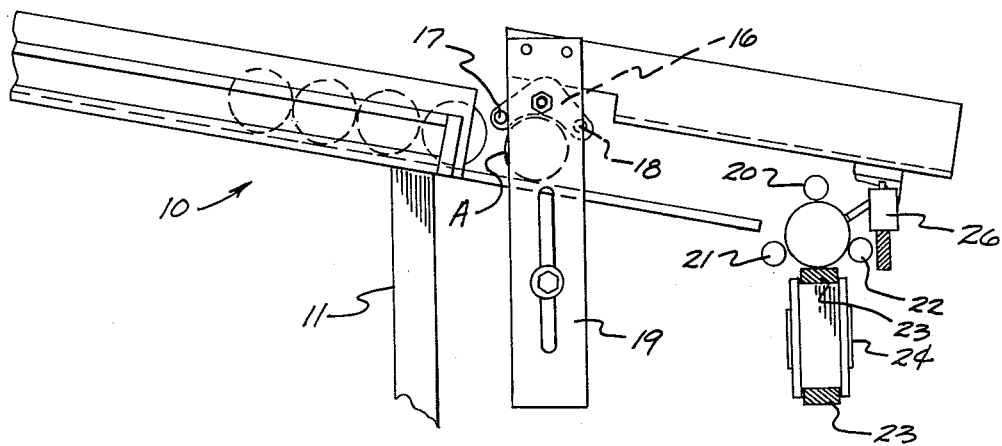
FIG. 4 is a vertical cross-sectional view of the apparatus as shown in FIG. 1 taken along a line IV—IV.
Figure 5:
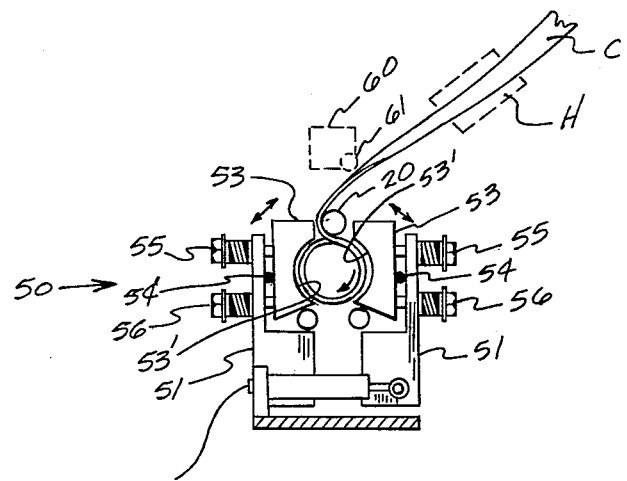
FIG. 5 is a partial vertical cross-sectional view of a portion of the apparatus as shown in FIG. 1 to the present invention taken along a line V—V, illustrating wrapper securement means.

Wrapping means 30 is best shown in FIGS. 1, 2, and 5. A support platform 31 is received on the general support frame 11 of the wrapping machine in horizontal pivotal association with a plate 12 located therebeneath. Adjustable support plate 31 has the drive means 70 located thereon along with the wrapper covering supply 30 for a purpose that will be discussed hereinafter. A pair of support rods 32 and 33 are secured to support plate 31 and extend outwardly and upwardly therefrom. Support rod 32 has a bearing 35 located at an outer end thereof through which an idler shaft 36 is received. Idler shaft 36 extends outwardly from its bearing support 35 and receives a roll 37 of wrapper covering C at an outer free end. A weighted strip 40 is supported by a strut 36' and may rest on roll 37 to retard unrolling of covering C. Support rod 33 is provided with a pair of tension and guide rods 38 and 39 which are contacted by covering C to properly tension same prior to being wrapped around a tube A. Covering C thus leaves roll 37, passes under first tension rod 38 over the second tension rod 39, partially over and around upper guide 20 and then spirally around the succession of tubes A passing through the wrapping machine. In the embodiment shown, the tubes A are rotated by drive means 70 in a counterclockwise direction such that wrapper C is pulled from the roll 37 and spirally wrapped around the succession of tubes A. As shown in phantom in FIG. 5, a preheater H may be employed to preheat covering C prior to its wrapping contact with articles A, whereby improved securement of the covering to the article may result.

Subsequent to wrapping means 30 is a cover securement means generally indicated at 50 which is best described in FIGS. 1, 2 and 5. While the cover securement means 50 may be represented by various and sundry apparatus, a preferred apparatus is illustrated herein as a plurality of contact heater elements 53 that are moveable into and out of contact with the wrapped tube W. Each heater element 53 is secured to a support 51 which in turn is supported by the framework 11 of the machine. Support 51 has a fulcrum element 54 located between two spring loaded adjustment nuts 55 and 56 such that the heater element 53 is moveable about fulcrum element 54 to self-center on wrapped tubes W. Heater elements 53 have electrical connectors (not shown) associated therewith to afford a source of heat to the element. Likewise, heater elements 53 have a concave heating surface 53' for contact with the wrapped article W, the concavity generally following the outer curvature of wrapped article W. As mentioned above, cylindrical articles that may be wrapped according to the teachings of the present invention, may vary in length and diameter. Hence, when heating elements 53 are employed, different size heating elements may be provided according to the particular length and diameter of the article to be wrapped. As the wrapped tube W thus passes through cover securement zone 50, heating elements 53 are maintained in contact with the wrapped tube W and impart sufficient heat to tube A within the wrapper C to heat same and cause a physical securement of the filter paper C to the outer periphery of same. Since the wrapped tubes W are moving forward through the wrapping machine as the heater elements 53 are held in contact therewith, it is desirable that the concave heating surface 53' offer as little resistance to the wrapped articles as possible to avoid misalignment of the covering thereon prior to securement. The contact surface of heater elements 53 may thus be provided with a contact surface that offers low frictional resistance. A covering of tetrafluoroethylene may, for example, be applied to the concave surface 53' of heater elements 53.

Where a preheater H is employed to preheat the covering C prior to same being wrapped around articles A, lower temperatures may be employed at heating elements 53, or the speed of operation may be increased, or both. In like fashion, the preheater may be employed to preheat the articles being wrapped. Since heater elements 53 are contact heaters and the normal covering material is paper, heater elements are arranged to automatically move out of contact with the articles A coincident with cessation of operation of the machine. Such avoids scorching and/or burning of the covering C.

Whereas cover securement means 50 has been defined in the sense of using contact heater elements 53, other securement means may be likewise employed. For example, a source of adhesive for a wrapper covering may be provided as also shown in phantom in FIG. 5 as 60 where a reservoir may contain adhesive and a roll or the like 61 applies same to an under side of covering C prior to its engagement with the article A to be wrapped. In such an embodiment, contact heaters could continually be utilized, if necessary, or be replaced by a heat tunnel or the like located along the path of the wrapper machine. Similarly, a sonic welder may be employed in lieu of heater elements to secure the wrapper covering C to the cylindrical article A. Likewise, any other suitable securement means may be employed as desired for the particular cylindrical article to be wrapped.

Figure 6:
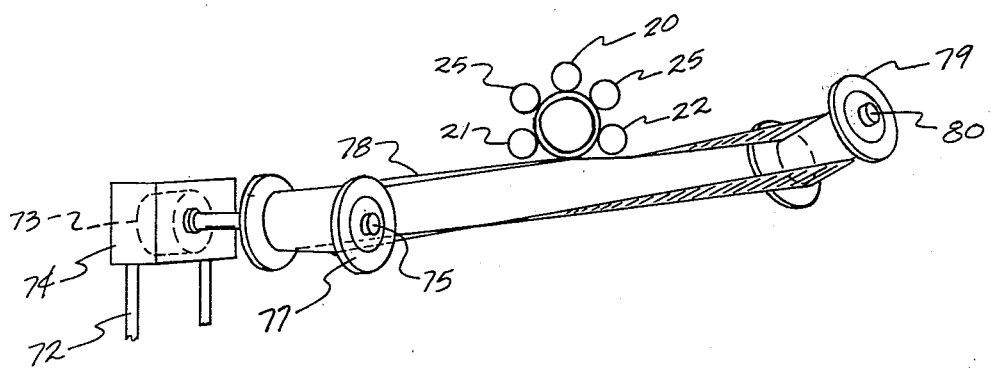
FIG. 6 is a vertical cross-sectional view of a portion of the apparatus as illustrated in FIG. 1, taken along a line VI—VI, illustrating the drive means.
Figure 7:
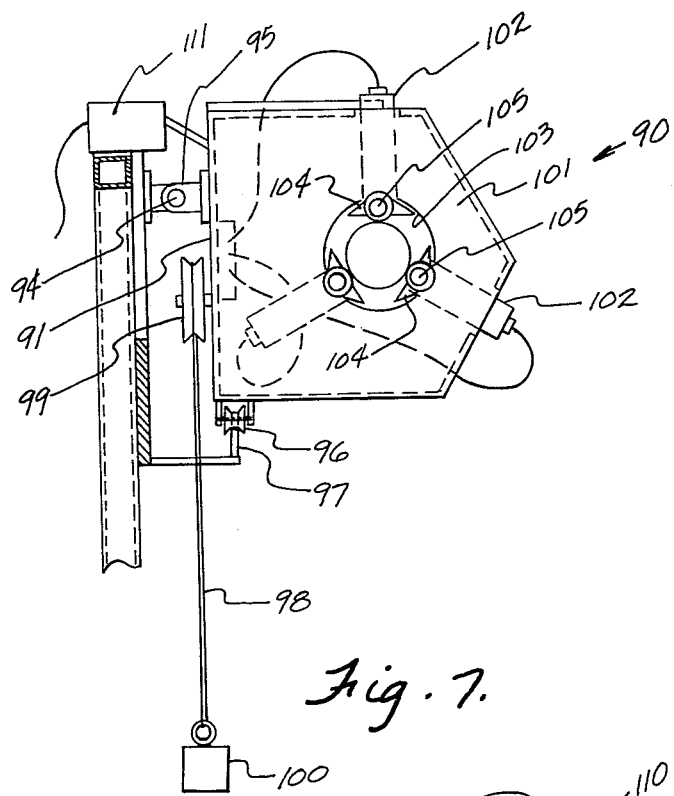
FIG. 7 is a vertical cross-sectional view of a portion of the apparatus as illustrated in FIG. 1 taken along a line VII—VII, illustrating article severing means.
Figure 8:
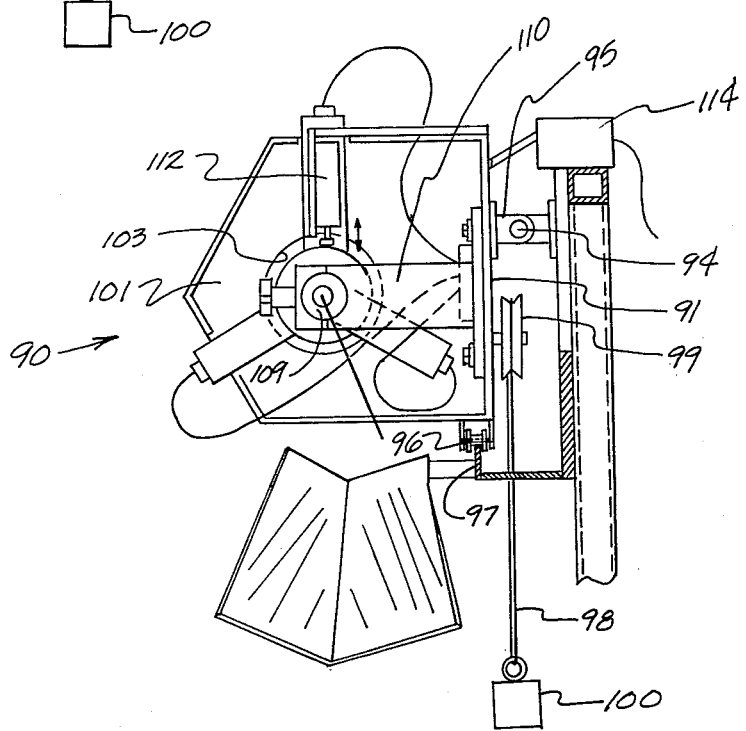
FIG. 8 is a vertical cross-sectional view of a portion of the apparatus as illustrated in FIG. 1 taken along a line VIII—VIII, illustrating article severing means.
Figure 9:
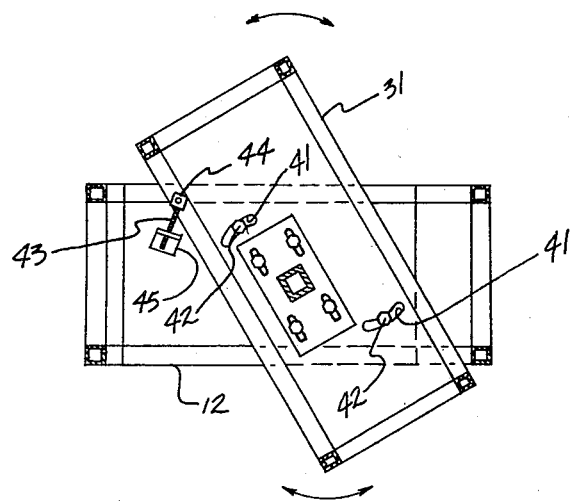
FIG. 9 is a plan view of the mutual support for the wrapping covering supply and the drive means.

Downstream from the cover securement means, the continuously wrapped series of articles, still within the confines of the guide rods 20, 21 and 22 are encountered by a drive means to afford rotary and forwarding motion to the wrapped succession (See FIGS. 1, 2 and 6). While various and sundry type drive means may be employed so long as both rotary and forwarding motion are imparted thereto, a preferred means includes a drive belt 78. The drive means generally indicated as 70 is supported from the support plate 31 that likewise supports wrapping means 30. As mentioned above, support plate 31 is supported for horizontal adjustable movement about a horizontal plate 12 of the support frame 11 for the wrapping machine. Since the cover C is being spirally wrapped around the series of articles, and the drive means is angularly located with respect to the wrapped succession of articles to impart both a rotary and forwarding motion thereto, location of both the cover supply means and the drive means on a common support 31 permits simultaneous angular adjustment of both with respect to the path of travel of articles through the wrapping machine. Hence for various length and diameter articles to be wrapped, a different angle of wrap may be desired as well as different angle between the drive means and the wrapped series of articles.

Referring more particularly to FIGS. 1, 2, 6 and 9, drive means 70 for the wrapped articles will be described in detail. Support plate 31 is rotatable about slots 41 (See FIG. 9) and is capable of horizontal movement therearound in the direction of the double headed arrows. Bolts 42 are received in slots 41 and may be tightened to secure plate 31 at its desired location. With bolts 42 loose, plate 31 may be precisely located by a threaded adjustment rod 43 that is received between a fixed securement location 44 in plate 31 and an adjustment nut 45 that is received in plate 12 of support frame 11. Wrapping means 30 and drive means 70 may thus be simultaneously angularly adjusted with respect to the path of tubes A through the wrapping machine to achieve a predetermined spiral wrap and drive motion therefor.

Drive means 70 generally includes a motor 71 which is drivingly connected to a pulley 72 by a belt 73. Pulley 73 is received within a housing 74 and has a drive shaft 75 secured thereto. An outer end of drive shaft 75 is received in a bearing 76 and a sheath 77 is located therealong. Sheath 77 receives an endless belt 78 therearound. An opposite end of belt 78 is received around an idler sheath 79 which is freely rotatably mounted on a support 80 at an angle with respect to sheath 77. Belt 78 is twisted prior to securing opposite ends together to form the endless loop to permit passage around the wrapped series of articles as desired. Drive belt 78 should be located as close as possible to the end of securement zone 50 as mentioned hereinbefore. As the drive zone location 70, in a preferred embodiment two further guide members 25 are positioned along the path of travel. Guide members 25 are preferably elongated rollers to assist in maintaining the proper alignment of the series of wrapped articles W and the covering C therearound. With particular reference to FIGS. 1 and 6, belt 78 passes under guide roll 21 and the wrapped series of articles after which the belt turns upwardly and is completely wrapped in spiral fashion around a portion of the wrapped series of articles extending therefrom around idler pulley 79. The return portion of the belt 78 passes directly from idler pulley 79 under the guide rods and wrapped articles W to sheath 77. Utilizing this particular arrangement, both a rotary and a forwarding motion are applied to the wrapped series of articles to which the covering has been secured. As the wrapped series of articles is forwarded by drive means 70, the series passes from the guide rods 20, 21, 22 and 25 to the article severing means 90.

Article severing means 90 is more particularly illustrated in FIGS. 1, 2, 7 and 8. Making particular reference thereto, this portion of the wrapping machine of the present invention will now be described. Article severing means 90 includes a support carriage 91 which is moveable in a horizontal direction away from and toward drive means 70. A guide rod 94 is secured to support frame 11 of the wrapping machine and passes through a bearing surface 95 secured to an upper end of carriage 91. A lower end of carriage 91 is provided with a rotatably mounted grooved wheel 96 that rests upon a trackway 97 that is supported from framework 11. Carriage 91 is further provided with a counter weighting system (see FIGS. 7 and 8) which includes an elongated element 98 secured to a portion of carriage 91 (not shown) and passing over a pulley 99 with a weight 100 secured to a lower free end thereof. Weight 100 constantly urges carriage 91 toward an initial position immediately adjacent drive means 70 to receive wrapped articles W.

Carriage 91 is provided with a collar 101 which has an article receiving opening 103 therethrough. A plurality of tapered guide elements 105 are located around opening 103 to properly guide wrapped articles W therethrough. Spacially separate from collar 101 is a bearing surface 107 that is adjustably received in an arm 110 which is attached to carriage 91. Bearing surface 107 is secured to a plunger 108 that is received in an air cylinder 109. Cylinder 109 is horizontally adjustable along arm 110 to be located at a predetermined distance from collar 101 such that wrapped articles W passing through collar 101 will engage bearing surface 107 at a predetermined distance. After contacting bearing surface 107, the series of wrapped articles W force carriage 91 away from drive means 70 to a point where a switch means 111 is energized which actuates plural cutting elements 102 that are mounted on the rear side of collar 101 to cause cutting blades 104 to move outwardly to an operative cutting position against covering C to sever the wrapper covering C between articles. Cutting blades 104 may be stationary in the sense of rotational movement and the cutting action is produced by the rotation of the wrapped article against blades 104. Alternatively, as discussed hereinafter, cutting blades 102 may be mounted on a plate that rotates counter to the direction of rotation of the wrapped articles whereby cutting time is reduced. While three cutting blades 104 are illustrated, obviously a greater or fewer number may be employed. Since three blades are employed, and equispaced around opening 103, only approximately ⅓ turn of wrapped article W is necessary for complete severance of covering C. After severance of wrapped article W, bearing surface 107 extracts into cylinder 109 and the severed wrapped article W falls from the severing means 90 into an appropriate receptacle 120. Once the pressure of the wrapped article against bearing surface 107 is relieved, weight 100 causes carriage 91 to return to its original position to receive a further wrapped article for severing. Since it is possible for the wrapped article W to jam carriage 91, a plunger 112 is located above the path between collar 101 and bearing surface 107. Plunger 112 is actuated in timed relation with completion of the cut and retraction of bearing surface 107 to contact wrapped article W and force same from between collar 101 and bearing surface 107. Switch means 111 is located to move the cutting blades 104 into a cutting position precisely at the juncture between two tubes A. A further switch means 113 is engaged adjacent the normal end of travel of carriage 90 to retract blades 104, and plunger 112 and to return bearing plate 107 to its original position. A yet further switch means 114 is located beyond switch means 113 and serves as an emergency stop for the machine when energized.

Figure 10:
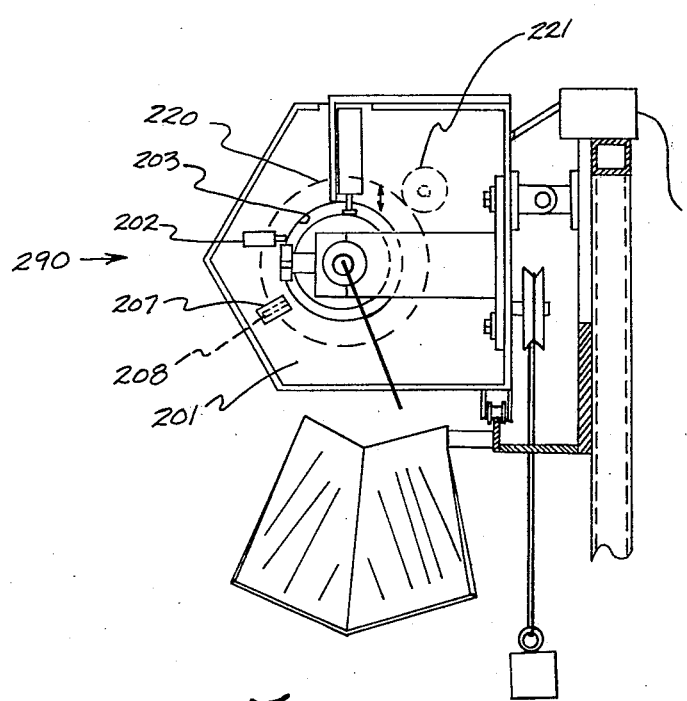
FIG. 10 is a vertical cross-sectional view of the article severing means as would be located along a line X—X, illustrating a further embodiment of same.

FIG. 10 illustrates further embodiments of the present invention. A partial severing means 290 is illustrated, showing a collar 201 having an opening 203 therethrough for receiving wrapped articles. A cutting means 202 is illustrated, exemplary of a laser which would be actuated in proper timed relation to project a coherent light source against covering C to burn same between adjacent tubes A. while only one such laser is illustrated, obviously any desired number could be utilized. Similarly, hot wires or other means for severing the wrapped article W may be employed according to teachings of the present invention. A plate 220 is shown in phantom in FIG. 10 having a drive means 221, also in phantom associated therewith. Cutting means 202, or the cutting means of the other Figures could be mounted on plate 220, with plate 220 being rotated preferably counter to the direction of rotation of the wrapped article or tube, whereby cutting time may be reduced. In a most preferred arrangement, drive means 221 is reversible, whereby plate 220 can be rotated for a proper distance, after which drive means 221 would reverse and return plate 220 to its original position.

Further an article identification means 207 is illustrated adjacent opening 203 of collar 201. As shown, a marking element 208 is housed in means 207. In proper timed relation element 208 would move out of means 207 into contact with wrapped article W and apply appropriate indicia thereto. Three such identification means could be employed around opening 203 and apply an identification ring around an end of a wrapped tube.

Figure 11:
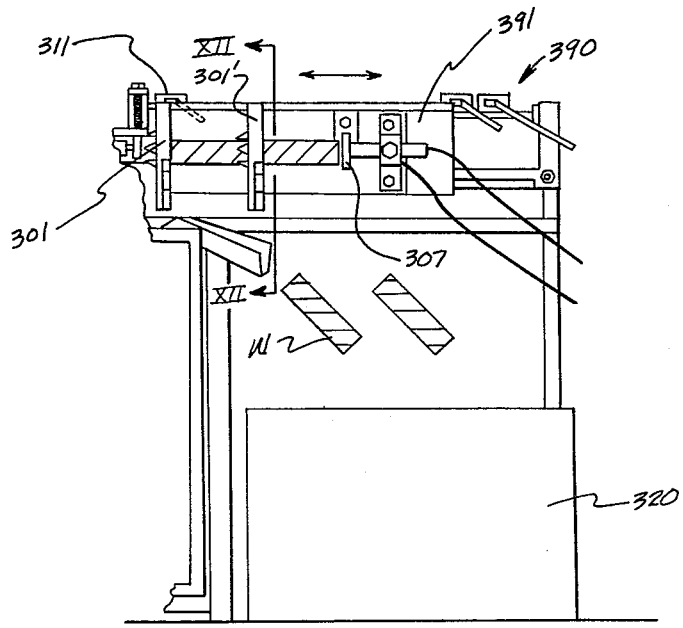
FIG. 11 is a partial side elevational view of an article severing means according to the present invention, illustrating a further embodiment of same.
Figure 12:
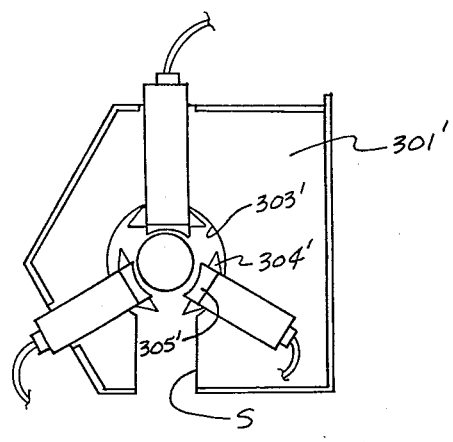
FIG. 12 is a partial vertical cross-sectional view of the article severing means as illustrated in FIG. 11 along a line XII—XII.

A further embodiment of a severing means 390 of the present invention is illustrated in FIGS. 11 and 12. Severing means 390 utilizes two collars 301, 301' instead of one as shown in FIGS. 1 and 2, whereby two wrapped articles may be severed simultaneously to increase the speed of operation of the apparatus. The series of wrapped articles would thus pass through collars 301 and 301' and engage bearing 307 to move carriage 391 outwardly. Once switch 311 is actuated by carriage 391 moving out of contact with same, cutting elements associated with both collars 301 and 301' would be actuated to sever two articles. Once severed, the wrapped articles W would fall into receptacle 320. Internal collar 301' has been modified to provide a slot S beneath opening 303' through which the then forward edge of the wrapped article associated with collar 301 may fall unimpeded. Likewise if necessary guide elements 305' could be provided on cylinders like cutting elements 304' to retract after severance of wrapped articles W to enable same to fall from severing means 390.

The general method of operation of the wrapping machine according to teachings of the present invention will now be described in the context of wrapping axially collapsible dye tubes molded from thermoplastic synthetic polymeric materials such as polypropylene. Tubes A are provided in sloped tray 13 in two lines of same across the width of tray 13. Whenever switch 26 is actuated tube delivering means 15 oscillates forward to deposit two tubes A onto conveyor 23, and then rearward to segregate two more tubes from the lines on tray 13. Conveyor belt 23 transports the two tubes A through the area defined by guide elements 20, 21 and 22 to the wrapping station generally indicated as 30. The speed of the converyor belt 23 is such that physical abutment of the tubes A in end to end relationship is accomplished. At wrapping station 30, a filter paper covering C of a predetermined width is fed around top guide bar 20 and onto the rotating dye tube thereat. The filter paper C is supplied from a roll 37 and is maintained under a preset tension by tension bars 38, 39. The previously wrapped series of dye tubes W is afforded a rotary and forwarding motion by drive means 70 and thus continuously rotates tubes A in contact therewith at wrapping station 30 to draw the filter paper C spirally therearound. Subsequent to wrapping of the filter paper C around the dye tube A, the wrapped tube W enters securement zone 50 where heater elements 53 contact the wrapped dye tube W and impart adequate heat to thermally bond the filter paper to the outer periphery of the dye tube. Subsequent to securement of the filter paper to the dye tube, the wrapped series of tubes is forwarded to the severing means 90 by drive means 70. At severing means 90, the wrapped tubes W are guided by tapered guide elements 105 through an opening 103 in a collar 101, and contact a rotatable bearing surface 107 that is located at a predetermined distance from collar 101. Force on bearing surface 107, causes carriage 91 to move outwardly away from the wrapping machine to a point where engagement with switch means 111 is lost, actuating same. Cutting blades 104 then move from the confines of their holders 102 into the path of the rotating wrapped tube W. Rotation of the wrapped tube W causes the paper covering C to be severed at the juncture between two tubes, after which bearing surface 107 retracts and the severed tube W is dislodged from the carriage 91 by gravity or by plunger 112 and falls into a receptacle 120 therefor. Actuation of switch 113 retracts blades 104, and plunger 112 and returns bearing 107 to its original position. With the pressure removed from bearing surface 107, counter weight 100 returns carriage 91 to its original position at which point a further wrapped tube W is received and the cutting cycle repeats. Should a longer tube be wrapped, bearing surface 107 is moved further away from collar 101.

Elements of the apparatus that are actuatable for movement are shown to be received in air cylinders with certain of the air lines shown. For the sake of clarity neither the entire air connections, nor operation of the cylinders has not been described. Such does not per se form a part of the present invention and one skilled in the art should readily know the appropriate manner of connecting same to achieve the described functions. Moreover, any type of means to actuate the various elements will suffice so long as the ultimate function of the apparatus is not adversely affected.

Figure 13:
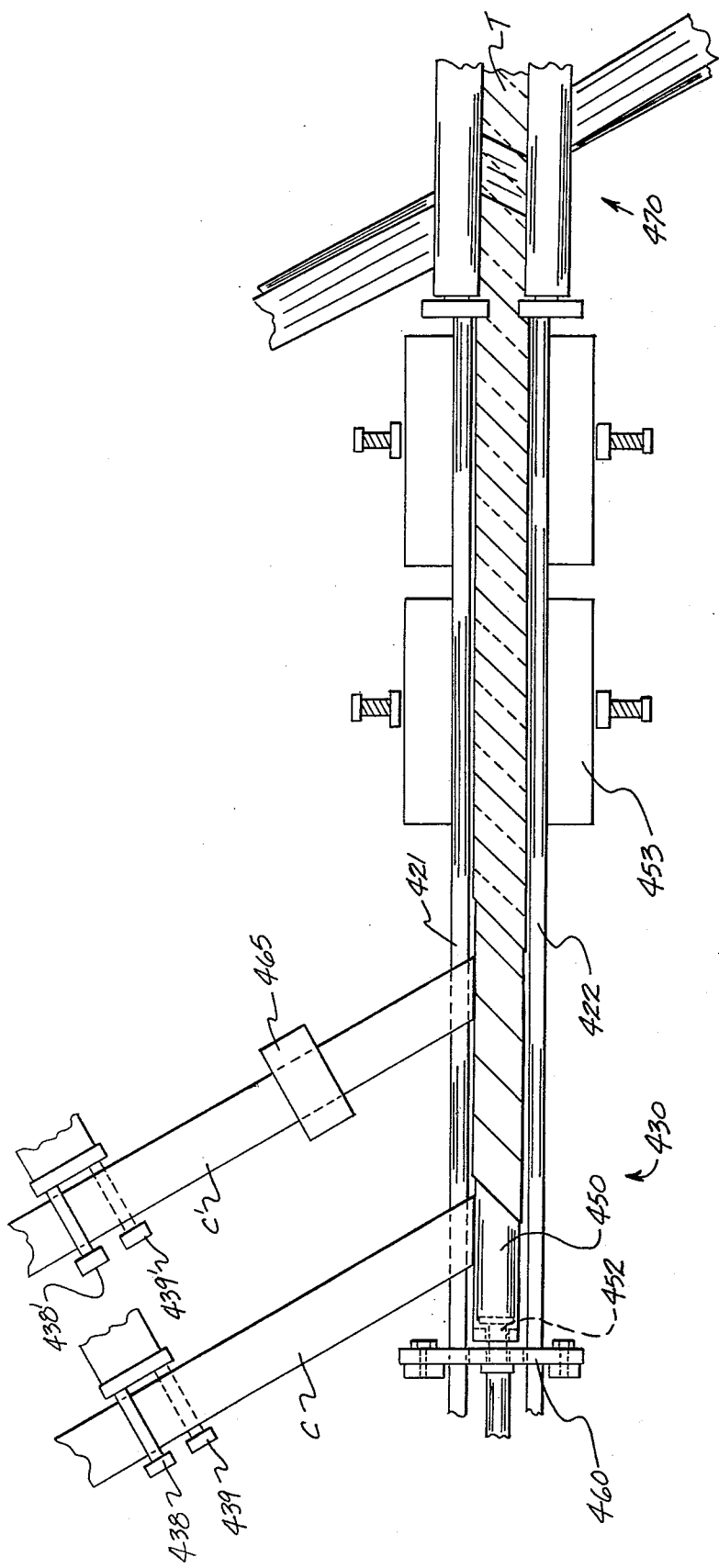
FIG. 13 is a partial plan view of a wrapping station according to the present invention, illustrating a further embodiment of same.

FIG. 13 illustrates a further embodiment of apparatus according to teachings of the present invention for use in the manufacture of tubes. Only the portion of the modified apparatus is shown that is necessary to describe the tube manufacture. A wrapping station 430 is generally shown with two separate covering elements C, C' being supplied thereto. Instead of feeding plural articles to wrapping station 430, a rotatable mandrel 450 is provided at station 430. Mandrel 450 resides within the confines of guide rods 421 and 422 and has a bearing 452 received in an end thereof. Bearing 452 is secured to an outer free end to a holding frame 460 whereby mandrel 450 is free to rotate, but will not move away from wrapping station 430. Cover material C is fed to mandrel 450 via tension elements 438, 439 and guide rod 421 where cover C is drawn around mandrel 450 by the rotation imparted thereto by drive means 470. Adhesive or some other bonding agent is applied to at least a portion of cover C by an application means 465 whereby cover C will adhere to itself along the overlap portions of the spiral wrap. Subsequent to the spiral wrap, heaters 453 or the like may be employed to cure or otherwise set the adhesive and produce a tubular element. As shown second covering C' is fed on top of first covering C and produces a separate spiral wrap. Tube T can thus be manufactured of any desired thickness and any desired number of layers. Downstream of heater elements 453, a rotary forwarding drive means 470 acts on the produced continuous tubular length to impart the rotation for mandrel 450 drawing further material therearound and for forwarding the length of tubular element to a severing means of the type previously shown in the Figures where tubes T of predetermined length may be severed from the continuous length. Further, depending on the material from which the tubes are to be manufactured, the speed of operation and the like, it may be necessary or desirable to provide a slight taper on mandrel 450 towards drive means 470, to coat mandrel 450 with a low friction surface, or the like. Likewise any suitable material securement means may be employed.

In practicing the method of producing tubes by the apparatus of the present invention, the rotatable fixed mandrel 450 is provided and the one or more widths of tube material C, C', etc. are supplied to mandrel 450. Drive means 470 acts on a previously produced length of tube to afford rotary motion thereto, whereby material C is spirally wound around mandrel 450. Material C is then secured to itself by adhesive, sonic welders or the like in the securement zone illustrated by contact heaters 453. Once formed, the length of tube is forwarded by drive means 470 to the tube severing means where tubes of predetermined length are severed from the continuous tube.

Figure 14:
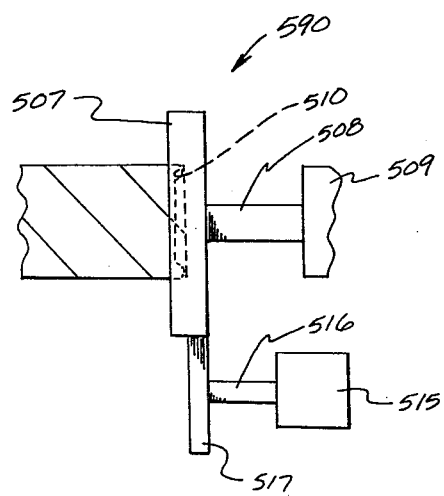
FIG. 14 is a partial elevational view of a severing means according to the present invention, illustrating a further embodiment of same.

Certain tubes employed in the textile industry, after formation, are treated to provide an inturned roll or flange at an end of same. As illustrated in FIG. 14, such an operation may be incorporated into the apparatus of the present invention. In FIG. 14, the severing means generally 590 is provided with a bearing plate 507 having a predetermined forming surface 510 in the surface of same. Plate 507 is secured to a plunger 508 receivable in a cylinder 509 as described hereinbefore. Further with the present embodiment, plate 507 is provided with a suitable drive means such as an air motor 515 having a drive shaft 516 with a drive roll 517 is contact with plate 507. Plate 507 could thus be rotated at high speed with a tube T in contact therewith to spin form the end of tube T into conformity with forming surface 510 of plate 507.

Having described the apparatus and method according to teachings of the present invention, it wil become obvious that modifications and variations thereto may be made without departing from the scope of the present invention. As such, the scope of the present invention should be determined by the claims apended hereto.

That which is claimed is:

1. A wrapping machine for cylindrical articles comprising:
  (a) means for supplying cylindrical articles to be wrapped;
  (b) wrapping means for continuously supplying a spiral wrapping around a series of articles supplied thereto;
  (c) wrapping securement means located adjacent said wrapping means;
  (d) drive means located adjacent said wrapping securement means, said drive means acting on previously wrapped articles to impart a rotary and forwarding motion to a series of previously wrapped articles and a rotary motion to unwrapped articles in contact therewith and draw wrapping therearound; and (e) article severing means, said article severing means comprising a carriage occupying a first position adjacent said drive means for receiving a forward wrapped article of said series of articles and being moveable in a direction away from said drive means, said carriage having cutting means thereon actuatable to separate a forward wrapped article from said series of same, said carriage further having a rotatable bearing surface spaced apart from said cutting means in a direction away from said drive means, said bearing surface being axially adjustable with respect to a path of travel of said wrapped articles to vary the distance therefrom to said cutting means, said bearing surface being contactable by said forward wrapped article with said carriage being moveable away from said drive means by movement of said wrapped articles, retractor means associated with said bearing surface to move said surface axially away from contact with said forward wrapped article, first actuator means located at a predetermined position along a path of travel of said carriage to actuate said cutting means at a predetermined position to separate said first article from said series, second actuator means located at a predetermined position along said path of travel of said carriage to deactuate said cutting means and actuate said retractor means at a predetermined time whereby said bearing surface is moved axially away from said forward wrapped article and said severed forward wrapped article falls from said carriage, and means to return said carriage to said first position after said severed article falls therefrom.

2. A wrapping machine as defined in claim 1 wherein said carriage has a collar received thereon, said collar defining an opening through which said forward wrapped article is guided, and wherein said cutting means comprises a plurality of blades received about said collar opening, each of said blades being moveable to a cut position upon actuation and returnable to a no cut position upon deactuation.

3. A wrapping machine as defined in claim 1 wherein said means for supplying cylindrical articles to be wrapped comprises a conveyor for feeding articles in end to end abutting relation to said wrapping means.

4. A wrapping machine as defined in claim 3 wherein said means for supplying cylindrical articles further includes article storage means and article dispensing means pivotally operable to segregate articles from said storage means and deliver same to said conveyor as desired.

5. A wrapping machine as defined in claim 4 wherein said article dispensing means comprises end plates having rods secured therebetween and extending across said article storage means, said rods receiving a number of articles therebetween and being pivotal away from said storage means to deliver said segregated articles to said conveyor.

6. A wrapping machine as defined in claim 3 wherein said conveyor has article alignment means associated therewith.

7. A wrapping machine as defined in claim 1 wherein said wrapping means comprises a supply of wrapping material located at an angle with respect to articles to be wrapped, means to tension said wrapping material, and means to guide said wrapping material into contact with a portion of said article.

8. A wrapping machine as defined in claim 7 wherein said supply of wrapping material comprises a roll of wrapping material received on a support therefor, said support being angularly adjustable with respect to said article.

9. A wrapping machine as defined in claim 1 wherein said wrapping securement means comprise at least one heater element.

10. A wrapping machine as defined in claim 9 wherein said heater element has a concave contact heating surface, said surface generally conforming to the curvature of the portion of said wrapped article coming into contact therewith.

11. A wrapping machine as defined in claim 10 wherein said heater element is pivotal into and out of contact with said wrapped article.

12. A wrapping machine as defined in claim 10 wherein a plurality of said heater elements are provided with said elements being located on opposite sides of said article.

13. A wrapping machine as defined in claim 1 where said drive means comprises a driven belt being located at an angle with respect to said series of wrapped articles, said belt passing around said series of wrapped articles and in contact therewith at an angle generally smaller to the angle of wrapping.

14. A wrapping machine as defined in claim 13 wherein said driven belt is twisted for one turn prior to securing opposite ends to each other.

15. A wrapping machine as defined in claim 2 wherein a plurality of collars are received on said carriage, each collar being located at a predetermined distance from other collars, and each collar having cutting means associated therewith for severing a plurality of articles during one cycle of carriage movement, all said collars between a first collar and said bearing surface defining a slot along a lower portion whereby a severed article may freely fall therethrough.

16. A wrapping machine as defined in claim 1 comprising further article dislodgement means received on said carriage and acting on said articles after the article is severed to dislodge same from between said cutting means and said bearing surface.

17. A wrapping machine as defined in claim 1 wherein said cutting means comprises a source of collimated coherent light.

18. A wrapping machine as defined in claim 1 further comprising indicia marking means associated with said carriage, said marking means being actuatable to place indicia on said wrapped articles.

19. A method for wrapping a cylindrical article comprising the steps of:

(a) providing a plurality of articles to be wrapped;

(b) sequentially feeding articles on demand to a wrapping station to provide abutting relationship between adjacent articles at the wrapping station;

(c) supplying wrapping material at an angular relationship to said articles at said wrapping station;

(d) imparting a rotary and forwarding motion to a series of previously wrapped articles to draw wrapping material in spiral fashion about a further of said articles;

(e) securing said wrapping material to said articles; and (f) forwarding said series of wrapped articles to a moveable carriage in a first position, engaging a rotatable bearing surface with a forward wrapped article and moving said carriage therewith;

(g) actuating cutting means at a predetermined time during carriage movement to sever said forward wrapped article while said article is in engagement with said bearing surface;

(h) deactuating said cutting means and retracting said bearing surface axially out of contact with said forward article after said forward article has been severed from said series whereby said severed article drops from said carriage; and (i) returning said carriage to said first position.

20. The method as defined in claim 19 wherein said articles are held in axial alignment at the wrapping station by guide means.

21. The method as defined in claim 20 wherein said wrapping material is tensioned and passes around a portion of said guide means into contact with said article.

22. The method as defined in claim 19 wherein the wrapping material is secured to the articles prior to the drive means.

23. The method as defined in claim 22 wherein the series of wrapped articles is engaged by a driven endless belt which imparts the rotary and forwarding motion thereto, said belt being twisted and wrapped around said series at an angle with respect thereto.

24. The method as defined in claim 19 wherein the cutting means are blades that when actuated move into contact with the rotating wrapped article whereby rotation of said article severs the article from the series.

25. The method as defined in claim 19 wherein after severing the article, plunger means are actuated to dislodge said article from said carriage.

26. The method as defined in claim 19 wherein cutting means are provided at plural, spaced apart locations to sever plural articles.

27. The method as defined in claim 19 wherein said cutting means comprises at least one source of collimated coherent light.

28. The method as defined in claim 19 wherein said means for securing the material to itself comprise adhesive applicator means and heater means.

29. The method as defined in claim 28 wherein said heater means comprise a plurality of contact heaters.

30. A wrapping machine for cylindrical articles comprising:

(a) means for supplying cylindrical articles to be wrapped and segregating upon demand at least one article from a group of same;

(b) article transport means located adjacent said supply means for receiving segregated articles and transporting same to a wrapping means, said articles being in alignment and in abutting engagement with the next adjacent prior article at the wrapping means;

(c) wrapping means for continuously supplying a spiral wrapping around a series of abutting articles transported thereto;

(d) contact heater means located downstream of said wrapping means for securing said spiral wrapping to said articles, said heater means being pivotal into and out of contact with wrapped articles and being adapted for self aligning contact with said wrapped articles;

(e) belt drive means located downstream from said heater means and passing in contact with said wrapped articles to impart a rotary and forwarding motion thereto, whereby the next adjacent unwrapped articles at said wrapping means is rotated and wrapping is drawn therearound in spiral fashion, said wrapping means and said drive means being mounted on a common, adjustable support whereby angular adjustment of said support simultaneously adjusts the angle of wrapping and the angle of the belt drive means with respect to the wrapped articles;

(f) article severing means located downstream of said drive means, said article severing means comprising a carriage occupying a first position and being moveable in a direction away from said drive means, said carriage having guide means thereon to receive a forward wrapped article of said series in proper alignment, cutter means adjacent said guide means and being actuatable to sever said forward wrapped article from said series of same, means to move said cutter means to and from a cutting position, a rotatable bearing surface received on said carriage and being spaced apart from and in alignment with said guide means, said bearing surface being axially adjustable to vary the distance between said cutter means and said bearing surface, said bearing surface being contactable by said forward wrapped article whereby said carriage is moved away from said drive means by movement of said wrapped series of articles, retractor means associated with said bearing surface to move said surface axially away from said forward wrapped article, first actuator means located at a predetermined position along a path of travel of said carriage to actuate said movement means whereby said cutter means are moved to a cutting position, second actuator means located at a predetermined position along said path of travel of said carriage to deactuate said movement means whereby said cutting means are returned to a non-cutting position, and to actuate said retractor means whereby said bearing surface is moved axially away from said end of said severed forward wrapped article, and said forward wrapped article falls from said carriage, and means to return said carriage to said first position.

* * * * *

UNITED STATES PATENT AND TRADEMARK OFFICE
CERTIFICATE OF CORRECTION

PATENT NO. : 4,385,480
DATED : May 31, 1983
INVENTOR(S) : Robert L. Burchette, Jr.

It is certified that error appears in the above-identified patent and that said Letters Patent are hereby corrected as shown below:

Column 4, line 61, "according" should read --covering--.

Column 6, line 50, "at" should read --as--.

Column 8, line 38, "As", second occurrence, should read --At--.

Column 12, line 43, "is" should read --in--.

Column 12, line 49, "wil" should read --will--.

Column 14, claim 13, line 28, "smaller" should read --similar--.

Signed and Sealed this

Twentieth Day of December 1983

[SEAL]

Attest:

GERALD J. MOSSINGHOFF

Attesting Officer   Commissioner of Patents and Trademarks